Patented Mar. 30, 1937

2,075,153

UNITED STATES PATENT OFFICE 2,075,153

LIGHT FILTER

Gustav Wilmanns, Wolfen Kreis Bitterfeld, Germany, assignor to I. G. Farbenindustrie Aktiengesellschaft, Frankfort-on-the-Main, Germany No Drawing. Application August 31, 1935, Serial No. 38,855. In Germany September 4, 1934

4 Claims. (Cl. 95—81.5)

My present invention relates to light filter.

One of its objects is a new light filter which absorbs waves of shorter wave length and transmits waves of the wave length of infra-red rays and longer waves. Further objects will be seen from the detailed specification following hereafter.

For the purpose of scientific photography, photography in connection with crime, the investigation of body colors and other purposes, infra-red radiation of a definite wave length is frequently used. For example, with spectroscopes in which grating spectra are used, a filter is required which allows to pass as undiminished as possible radiation above 8200 Ångström units, but absorbs completely radiation below 8200 Ångström units.

Light filters are known in the trade which absorb the ultra-violet and the whole of the visible radiation while they are transparent to the infra-red. These filters have, however, the disadvantage that, in consequence of the flat absorption limits, either they allow traces of the visible spectrum (dark red) to pass or, when the dyestuff is used in high concentration, they absorb a considerable portion of the infra-red radiation itself. Further, it is a great disadvantage that the limits of transparency within the infra-red cannot be varied, for dyestuffs the absorption of which is steeply graded in the infra-red region have been lacking.

This invention produces infra-red filters of excellent transparency by combining with the known filter-dyestuffs, dyestuffs which absorb the ultra-violet and visible portions of the spectrum up to bright red, such as dyestuffs of the class which includes penta-, hepta-, nona- and undecamethine-cyanines.

The dyestuffs are, as usual, preferably used in colloid layers; in order to avoid any incompatibility between the dyestuffs, the penta-, hepta-, nona- or undeca-methine-cyanine is incorporated in a separate colloid layer. The pentamethine-cyanines absorb wave lengths from about 5100 to about 8200 Ångström units, the heptamethine-cyanines absorb wave lengths from about 6000 to 9000 Ångström units, and the nonamethine-cyanines absorb wave lengths from about 6500 to 10,000 Ångström units. There are suitable the thio compounds, the seleno compounds, the oxo compounds, the indo compounds, and the quino compounds.

The layers may be made of any desired colloid; particularly advantageous are layers of gelatin, since the known polymethine-cyanine dyestuffs, of little fastness to light, have sufficient fastness for the purpose when in a gelatin layer. The new infra-red filters have the following advantages as compared with the known infra-red filters:—

(1) The absorption limits are very sharply defined.

(2) The transparency on the other side of the absorption limit is extraordinarily high.

In accordance with the selection of the polymethine-cyanine the absorption limit may be brought into any desired region of the infra-red. A suitable choice of the length of the polymethine chain, of the ring system, of the substituents in the molecule of the polymethine-cyanine and the dyestuff concentration, it is possible to vary the absorption limit by a large or small amount.

In many cases a mixture of two or more polymethine-cyanines is necessary or advantageous for obtaining a filter of extended absorption. Also, several differently colored filter layers may be superimposed.

For making filter films with aid of polymethine-cyanine dyestuffs a suitable filter-gelatin having high physical constants is washed and melted with distilled water to produce a solution of 10–15 per cent. strength. Into this solution, heated to 40–50° C., there is gradually stirred the heated solution of the cyanine dyestuff in methanol. The gelatin is then allowed to solidify quickly. The colored gelatin is cut into noodles and washed until most of the methanol used has disappeared. The colored gelatin is then ready for casting. The thickness of the layer may vary within wide limits. The films may be used as such or may be applied to glass plates. The concentration of the dyestuff depends upon the desired degree of absorption. A filter made in this manner is combined with a known filter which absorbs all the radiation from ultra-violet to bright red.

The following examples illustrate the invention:

*Example 1.*—For 10 grams of gelatine 30 mgms. of the dyestuff bis-[3-ethyl-benzthiazole-(2)]-pentamethine-cyanine nitrate are used. A sheet made from this colored gelatin absorbs sharply the radiation from 8200 Ångström units to 5100 Ångström units. The blue filter thus obtained is combined with an ordinary red filter, for example an Agfa red filter No. 42, which is transparent only to radiation above 6000 Ångström units. The combination provides a light filter of excellent transparency for waves above 8200

Ångström units with complete absorption of the whole of the visible spectrum.

Example 2.—The filter is prepared as described in Example 1 with the difference that instead of the pentamethine-cyanine of this example there is used bis-[3-ethyl-naphtho-1'.2':4.5-thiazole-(2)]-heptamethine-cyanine chloride. When combined with a red filter as described in Example 1 the filter absorbs all waves up to a wave length of about 9200 Ångström units.

What I claim is:

1. A light filter transparent to infra-red radiation which consists of a colloid layer colored with dyestuffs belonging to the class of penta-, hepta-, nona- and undeca-methine-cyanines and with filter dyestuffs that absorb ultra-violet to bright red.

2. A light filter transparent to infra-red radiation which consists of a colloid layer colored with dyestuffs belonging to the class of penta-, hepta-, nona- and undeca-methine-cyanines united with a colloid layer colored with a filter dyestuff that absorbs ultra-violet to bright red.

3. A light filter transparent to infra-red radiation which consists of a gelatin sheet colored with bis-[3-ethyl-benzthiazole-(2)]-pentamethine cyanine nitrate united with a red filter.

4. A light filter transparent to infra-red radiation which consists of a gelatin sheet colored with bis-[3-ethylnaphtho-1'.2':4.5-thiazole-(2)]-heptamethine-cyanine chloride united with a red filter.

GUSTAV WILMANNS.